United States Patent [19]
Campbell

[11] 3,990,265
[45] Nov. 9, 1976

[54] JOULE-THOMSON LIQUIFIER UTILIZING THE LEIDENFROST PRINCIPLE

[75] Inventor: David Neil Campbell, Alcester, England

[73] Assignee: The Hymatic Engineering Company Limited, England

[22] Filed: May 2, 1975

[21] Appl. No.: 573,959

[30] Foreign Application Priority Data
May 3, 1974 United Kingdom............... 19607/74

[52] U.S. Cl. ............................................ 62/514 JT
[51] Int. Cl.² ......................................... F25B 19/00
[58] Field of Search............................ 62/55, 514 JT

[56] References Cited
UNITED STATES PATENTS

| | | | |
|---|---|---|---|
| 3,320,755 | 5/1967 | Jepsen et al. ..................... | 62/514 JT |
| 3,353,370 | 11/1967 | Patten, Jr. et al. .............. | 62/514 JT |
| 3,418,822 | 12/1968 | Massey ................................... | 62/55 |
| 3,495,419 | 2/1970 | Hart.................................. | 62/514 JT |
| 3,548,607 | 12/1970 | Pillsbury, Jr. et al................... | 62/55 |

Primary Examiner—William F. O'Dea
Assistant Examiner—Ronald C. Capossela
Attorney, Agent, or Firm—Watson, Cole, Grindle & Watson

[57] ABSTRACT

For cooling a load which may be installed for example in an aircraft, and intended to be supplied from a bulk supply of liquid refrigerant, the latter is replaced by a liquid dispenser including a liquefier fed with gaseous refrigerant under pressure. The liquefier acts on the Joule Thomson principle and includes a heat exchanger having two paths through the first of which refrigerant gas from a supply at high pressure flows to an expansion nozzle through which it expands to an intermediate pressure above ambient pressure, causing some of the refrigerant to liquefy in a liquefying chamber while the remainder flows back through the second path of the heat exchanger to cool the incoming refrigerant; and a nozzle forming an outlet from the liquefying chamber and means for connecting a transfer pipe to the outlet.

14 Claims, 4 Drawing Figures

JOULE-THOMSON LIQUIFIER UTILIZING THE LEIDENFROST PRINCIPLE

This invention relates to cooling apparatus working on the Joule Thomson principle.

According to the present invention cooling apparatus includes a liquifier acting on the Joule Thomson principle and including a heat exchanger having two paths through the first of which refrigerant gas from a supply at high pressure flows to an expansion nozzle through which it expands to an intermediate pressure above ambient pressure, causing some of the refrigerant to liquefy in a liquefying chamber while the remainder flows back through the second path of the heat exchanger to cool the incoming refrigerant; a load in close proximity to and in heat exchange relationship with a liquid refrigerant evaporator, and a transfer pipe connecting the liquefying chamber to the evaporator, and arranged so that the intermediate pressure in the former causes a flow of liquid refrigerant, from the former to the latter.

A nozzle may be provided for restricting the flow rate from the liquefying chamber to the evaporator to a desired value. Alternatively or in addition throttling means may be provided in the return path of refrigerant flowing back through the second path of the heat exchanger in order to set the difference between intermediate and ambient pressures. Thus in order to ensure that only liquid is supplied into the transfer pipe it is desirable that the intermediate pressure in the liquefying chamber, depending on the inflow through the expansion nozzle and the escape through the second path of the heat exchanger, should be so related, to the rate of liquefaction and the restriction to flow of refrigerant through the outlet, that the latter flow is slightly less than the rate of liquefaction.

In some cases, in particular where the transfer pipe is of substantial length, the flow through it may be by Leidenfrost action. In such cases it is preferable that only liquid should flow through the outlet from the liquefying chamber, the carrier gas for the Leidenfrost action being produced by re-evaporation.

The transfer pipe being only subjected to low pressure, may be of a flexible plastics material.

The evaporator may be continually fed with liquid to balance the boil off. Alternatively where the load is required to operate for one or more operations of limited duration the evaporator may accommodate a sufficient store of liquid to maintain cooling of the load for the duration of an operation without further supply from outside. In the latter case the liquefier may be connected to the transfer pipe so as to be readily detachable from it, and arranged to be rendered operative by a supply of compressed gaseous refrigerant to it for a sufficient period to provide a supply of liquid refrigerant to the evaporator, whereafter the liquefier is disconnected.

The invention may be put into practice in various ways but one specific embodiment will be described by way of example, with reference to the accompanying drawings, in which.

Figure 1:
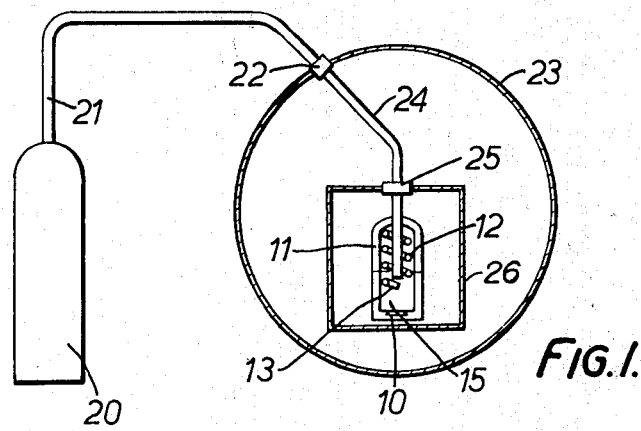
FIGS. 1 and 2 are diagrams respectively of two known systems for supplying liquid refrigerant to cool a load.

FIG. 1 shows one well-known system for cooling a small load such as an infra-red detector 10 by what is termed a mini-cooler 11, embodying a liquefier combined with an evaporator 15 in heat exchange relationship with load 10 to be cooled. The mini-color includes a heat-exchanger in the form of a coiled finned tube 12 forming a first path through which refrigerant gas at high pressure flows to an expansion nozzle 13 through which is expands into a container forming the evaporator 15, causing some of the refrigerant to liquefy in the container. The load 10 is close to a pool of liquid refrigerant in the container 15 which removes heat from the load and progressively evaporates.

FIG. 1 shows the mini-cooler as being fed with high pressure air, for example at a pressure of some 200 atmospheres, from a cylinder 20 through a high pressure gas pipe 21 which has a high pressure connection 22 at a point where it enters an enclosure such as an aircraft skin 23, a further high pressure pipe 24, and a further high pressure connection 25 where it passes through an enclosure 26 such as the casing of an infrared system. The pipes 21 and 24 and connections 22 and 25 must be capable of withstanding very high pressures, of the order of 200 atmospheres.

Constructions of such mini-coolers are described for example in British Patent Specifications Nos. 1,095,991, 863,961, 1,164,276, 1,230,079, 1,297,133, 1,297,132 and 1,216,189, each commonly owned herewith.

Figure 2:
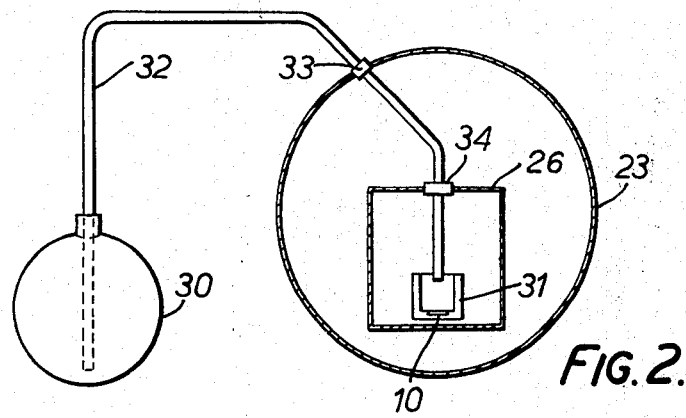

FIG. 2 illustrates another form of system in which liquid refrigerant from a bulk supply 30 such as a Dewar vessel of substantial size is fed to a small evaporator 31 also in the form of a Dewar vessel in heat exchange relationship with the load 10. The refrigerant is supplied through a pipe 32 which contains liquid refrigerant flowing direct to the evaporator 31 at relatively low pressure, normally less than one atmosphere above ambient. The pipe 32 may incorporate low pressure connections 33 and 34 where it passes through the skin 23 of the aircraft and the casing 26 of the infra-red system.

Although in some cases the evaporator may be continuously fed with liquid refrigerant throughout a prolonged operation, it will be assumed, as will usually be the case, that the load is required to operate for one or more cycles of limited duration, and that the evaporator accommodates a sufficient store of liquid for the duration of such an operation. In this case the bulk supply 30 may be connected to the connection 33 when the equipment is to be brought to a state of readiness, and disconnected when the evaporator 31 has been filled up, and before the operation begins.

The transfer of refrigerant may occur in accordance with the Leidenfrost action in which droplets of refrigerant liquid are impelled by a flow of refrigerant gas in which case a flexible plastics pipe may be used. Such arrangements are described for example in the commonly owned British Patent Specification No. 1,298,553, or No. 1,293,401. Otherwise it may be necessary to use an insulated metallic pipe to avoid excessive boil off of liquid.

There are however certain circumstances in which neither of these systems is wholly satisfactory, and the present invention, which virtually combines or telescopes the two, has substantial advantages.

Figure 3:
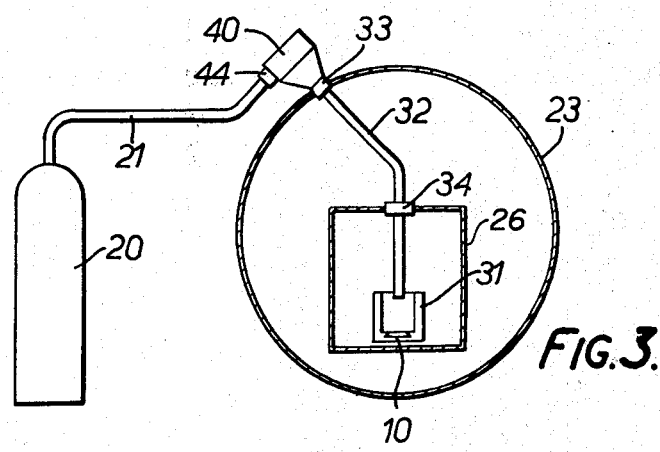
FIG. 3 is a similar diagram of the system in accordance with the present invention.

Thus FIG. 3 shows a system in accordance with the invention in which the parts within the aircraft skin 23, and their operation, are identical with those of FIG. 2, and bear the same reference numerals. Thus from the low pressure connection 33 at which the supply pipe passes through the aircraft skin the pipe 32 leads through the further low pressure connection 34 to the evaporator 31 in heat exchange relationship with the load 10.

On the other hand the part of the system outside the aircraft skin is fed from a high pressure supply 20 of refrigerant in gaseous form and nominally at ambient temperature and this is supplied to a liquid dispenser 40 in accordance with the invention. If the supply is from a cylinder its temperature may be slightly below ambient due to expansion, but if it is from a compressor its temperature will be above ambient if cooling after compression is not 100 percent.

Figure 4:
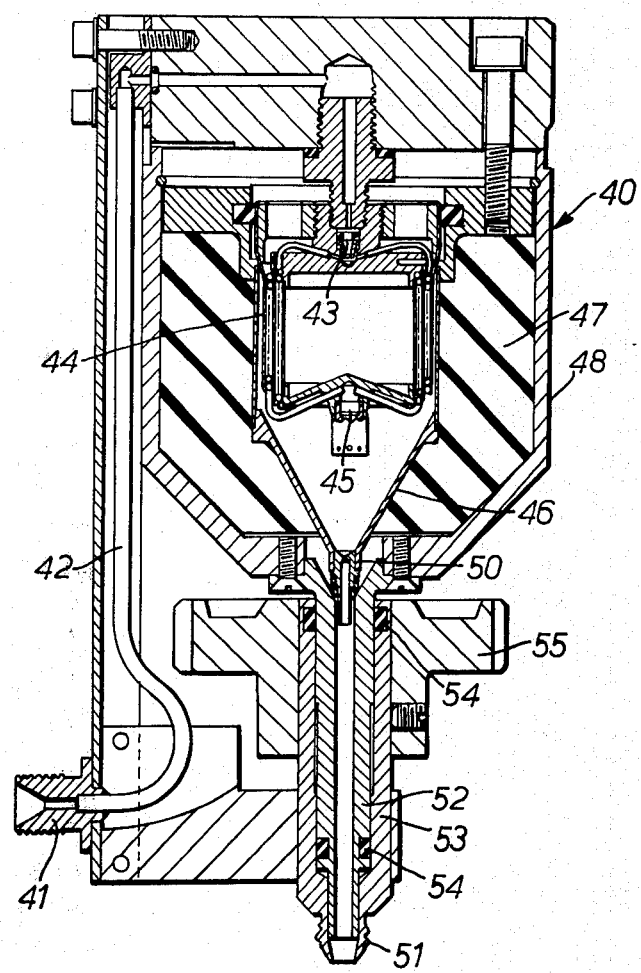
FIG. 4 is a sectional elevation of a liquid dispenser employed in the arrangement of FIG. 3.

The liquid dispenser 40 shown in FIG. 4 works on the same principle as the mini-coolers described in the first group of prior specifications referred to above.

Thus the high pressure gas enters at an inlet coupling 41 and flows through a pipe 42 to an inlet head 43 at the top of the dispenser, whence it flows down through a first path of a heat exchanger, actually constituted by two helically coiled finned pipes 44 connected in parallel, to an expansion nozzle 45.

From the expansion nozzle it issues into a conical liquefying chamber 46, arranged with its apex downwards, in which part of the refrigerant is liquefied while the remainder flows back through the second path of the heat exchanger formed by the space surrounding the coiled pipes 44 so as to cool the incoming refrigerant, after which it is exhausted to atmosphere. The liquefier is surrounded by insulating material 47 in an outer casing 48.

The construction of FIG. 4 differs from the known mini-coolers in that whereas the latter have no outlet for liquid from the container, so that the only outlet is the second path of the heat exchanger through which refrigerant escapes as and when it evaporates, in the liquid dispenser in accordance with the invention as shown in FIG. 4 the conical chamber 46, into which the refrigerant from the expansion nozzle 45 issues, has at its lower end a liquid delivery nozzle 50 leading into a transfer pipe coupling 51.

The liquid delivery coupling 51 comprises a fixed sleeve 52 surrounded by a rotatable sleeve 53 provided with sealing rings 54 and formed to screw into the low pressure connection 33 leading to the evaporator 31. The coupling is provided with a knob or nut 55 so that it can be readily screwed into the connection 33.

As in the known arrangement of FIG. 1 gaseous refrigerant under high pressure, for example 200 atmospheres, is fed to the liquid dispenser at the gas inlet 41 whence it flows through the first path of the heat exchanger and expands through the expansion nozzle 45 into the liquefying chamber 46. Part of the refrigerant is liquefied while the remainder escapes via the second path of the heat exchanger.

The arrangement is diagrammatically indicated in FIG. 3 as being fed from a cylinder of compressed gas (which might be nitrogen or air), but may equally well be supplied (normally with air) from a compressor mounted in the vehicle or other structure with which the cooler is associated. For example in one embodiment the liquefier becomes operative when it is supplied with air at a pressure of 200 atmospheres, for example when the engine of a launch vehicle is started, and within five minutes will supply 20 milliliters of liquid air to the evaporator, this being sufficient to cool the load for a period of 40 minutes at normal temperatures.

Thus the arrangement in accordance with the present invention, like the mini-cooler, can remain in a stand-by condition for a virtually unlimited period, without the necessity for any additional equipment or any additional bulk or weight. The liquefier becomes operative when supplied with refrigerant gas under pressure at ambient temperature.

This is a considerable advantage over the system of FIG. 2 employing a bulk supply of liquid remote from the load. With the latter if the apparatus is to remain for long periods in a stand-by condition, the loss of liquid refrigerant by boil off may be quite unacceptable or may require an inordinately large bulk supply of liquid. In addition it may involve operating difficulties because of freezing up due to entrainment of atmospheric water vapour when the bulk supply is connected to the transfer pipe. On the other hand there are circumstances in which it is not convenient to locate the liquefier in contact with the load for operational or installational reasons or where it is desired to encapsulate the load, and the mini-cooler fails to meet requirements.

In particular there are equipments initially built to employ a Leidenfrost or other system of liquid refrigerant, which cannot readily be adapted to employ the known mini-cooler system of FIG. 1.

It will be appreciated that the arrangement in accordance with the invention and shown diagrammatically in FIG. 3, may be substituted for the known arrangement of FIG. 2 without any modification of those parts shown as being within the aircraft skin. Thus in many instances the evaporator and load may be in the middle of a complex apparatus and any modification of the pipe for supplying refrigerant, particularly the replacement of the low pressure pipe 32 of FIG. 2 by the high pressure pipe 21 of FIG. 1, may involve difficulty. On the other hand by employing the present invention the modified equipment is simply applied to the existing filling connection 33 without requiring any modification.

The invention is not confined to the construction shown in FIG. 4. For example the liquefier may be in accordance with any one of the first group of prior specifications referred to above, with suitable modifications.

Thus it will be appreciated that the liquefier of FIGS. 3 and 4, though superficially similar to existing mini-coolers of FIG. 1, has a fundamental difference in that whereas the refrigerant in the known mini-cooler merely has to escape from the container in gaseous form, in the case of the liquid dispenser it is essential that a balance should be maintained between the refrigerant escaping in gaseous form through the second path of the heat exchanger and the refrigerant being delivered in liquid form to the evaporator where it evaporates and then escapes in gaseous form without flowing through the heat exchanger. Moreover the rate at which these two portions of the refrigerant escape from the dispenser should be balanced with the rate at which refrigerant is supplied through the expansion nozzle. In particular the liquid transfer nozzle 50 should be dimensioned to deliver refrigerant to the evaporator at a slightly lower rate than refrigerant is liquefied. The rate at which the liquid flows through the nozzle 50 will moreover depend on the pressure within the conical liquefying chamber 46 and this in turn will be influenced by the resistance to flow of the gas escaping through the second path of the heat exchanger. Accordingly it may be desirable not only to provide the nozzle 50 to meter the flow to the evaporator, but also it may in certain circumstances be desirable to restrict the escape of gaseous refrigerant through the second path of the heat exchanger, or the exhaust outlet from it. On the other hand it may be found that the resistance to flow of gas through the exhaust path of the heat exchanger provides a sufficient intermediate pressure in the liquefying chamber to impel the refrigerant liquid to the evaporator.

In a specific embodiment the high pressure gas is delivered from the compressor of a launch vehicle at a pressure of about 200 atmospheres while the pressure in the liquefying chamber may be approximately 0.5 to 1.0 atmospheres above that in the evaporator, which would normally be at ambient pressure.

What we claim as our Invention and desire to secure by Letters Patent is:

1. Cooling apparatus including a liquefier acting on the Joule Thomson principle and including, in combination:
    a heat exchanger having two flow paths;
    gas inlet means connected to the heat exchanger for directing a flow of refrigerant gas from a supply at high pressure through a first of the two paths;
    an expansion nozzle located at the end of the first path so that the flow of gas may pass therethrough and expand to an intermediate pressure above ambient pressure;
    a liquefying chamber connected to the heat exchanger and lying adjacent the nozzle for the reception of the entirety of the gas issuing from the nozzle, and in which some of the gas liquefies while the remainder thereof flows back through a second of the two paths of the heat exchanger to cool the refrigerant gas incoming from the gas inlet means;
    an evaporator;
    a load in close proximity to and in heat exchange relationship with the evaporator;
    means for venting the evaporator to allow evaporated refrigerant to escape to ambient without passing back through the heat exchanger;
    a transfer pipe connecting the liquefying chamber to the evaporator arranged so that intermediate pressure in the former causes a flow of liquid refrigerant from the liquefying chamber through the transfer pipe to the evaporator.

2. Apparatus as claimed in claim 1, further including a liquid transfer nozzle on the liquefying chamber for restricting the flow rate from the liquefying chamber to the evaporator to a desired value.

3. Apparatus as claimed in claim 2, in which the load is required to operate for one or more operations of limited duration, and the evaporator is so designed as to accommodate a sufficient store of liquefied gas for the duration of an operation without further supply from outside.

4. Apparatus as claimed in claim 3, in which the transfer nozzle of the liquefier is so designed as to supply liquid refrigerant at a rate substantially greater than the demand for it by the load so that the time taken to liquefy a store of liquid is substantially shorter than the time taken to evaporate it.

5. Apparatus as claimed in claim 2, further including means restricting flow of the refrigerant through the second path of the heat exchanger in order to set the difference between intermediate and ambient pressures.

6. Apparatus as claimed in claim 2, wherein the intermediate pressure in the liquefying chamber, depending on the inflow through the expansion nozzle and the escape through the second path of the heat exchanger, is so related, to the rate of liquefaction and the restriction to flow of refrigerant through the transfer nozzle, that the latter flow is slightly less than the rate of liquefaction.

7. Apparatus as claimed in claim 6, in which only liquid flows through the transfer nozzle from the liquefying chamber and the carrier gas for the Leidenfrost action is produced by re-evaporation.

8. Apparatus as claimed in claim 1, in which the flow through the transfer pipe is caused to occur by a Leidenfrost action.

9. Apparatus as claimed in claim 1, in which the transfer pipe is of a flexible plastics material.

10. Apparatus as claimed in claim 1, in which the liquefier (comprising the heat exchanger, expansion nozzle and liquefying chamber) is readily detachable from the transfer pipe.

11. Apparatus as claimed in claim 1, in which the evaporator and at least part of the transfer pipe are of a design capable of being installed in an existing equipment intended to be supplied with liquid refrigerant.

12. A method of supplying liquid refrigerant through a transfer pipe to an evaporator in close proximity to and in heat exchange relationship with a load, which comprises connecting to an inlet end of the transfer pipe an outlet from a liquefying chamber of a liquefier acting on the Joule Thomson principle and including a heat exchanger having two paths, supplying gaseous refrigerant under high pressure and nominally at ambient temperature to flow through a first of the two paths of the heat exchanger to an expansion nozzle through which it expands to an intermediate pressure above ambient pressure, causing some of the refrigerant to liquefy in the liquefying chamber and to flow into the transfer pipe while the remainder flows back through a second of the two paths of the heat exchanger to cool incoming refrigerant.

13. A method as claimed in claim 12 for providing in the evaporator a store of liquid refrigerant for use in a cycle of operation, in which the liquefier is connected to the transfer pipe only when the associated equipment is to be brought to a state of readiness, and is disconnected before the actual operation begins.

14. A liquid refrigerant dispenser for a cooling apparatus including a liquefier acting on the Joule Thomson principle and including, in combination:
    a heat exchanger having two flow paths;
    gas inlet means connected to the heat exchanger for directing a flow of refrigerant gas from a supply at high pressure through a first of the two paths;
    an expansion nozzle located at the end of the first path so that the flow of gas may pass therethrough and expand to an intermediate pressure above ambient pressure;
    a liquefying chamber connected to the heat exchanger and lying adjacent the nozzle for the reception of the entirety of the gas issuing from the nozzle, and in which some of the gas liquefies while the remainder thereof flows back through a second of the two paths of the heat exchanger to cool the refrigerant gas incoming from the gas inlet means;

an evaporator;

a transfer nozzle forming an outlet on the liquefying chamber for dispensing refrigerant liquid to the evaporator; and conduit means interconnecting the transfer nozzle with the evaporator.

* * * * *